(No Model.)

3 Sheets—Sheet 1.

N. W. AUSTIN.
WEIGHING AND PRICE SCALE.

No. 346,017.                    Patented July 20, 1886.

WITNESSES:
O. M. Hill
Jno. W. Freklé

INVENTOR
Newton W. Austin
per
Wm. Hubbell Fisher,
ATTORNEY (No Model.)  N. W. AUSTIN.  3 Sheets—Sheet 2.

WEIGHING AND PRICE SCALE.

No. 346,017.  Patented July 20, 1886.

WITNESSES:
O. M. Hill
Jno. B. Frekli

INVENTOR
Newton W. Austin
per Wm. Hubbell Fisher,
ATTORNEY (No Model.) 3 Sheets—Sheet 3.
N. W. AUSTIN.
WEIGHING AND PRICE SCALE.
No. 346,017. Patented July 20, 1886.
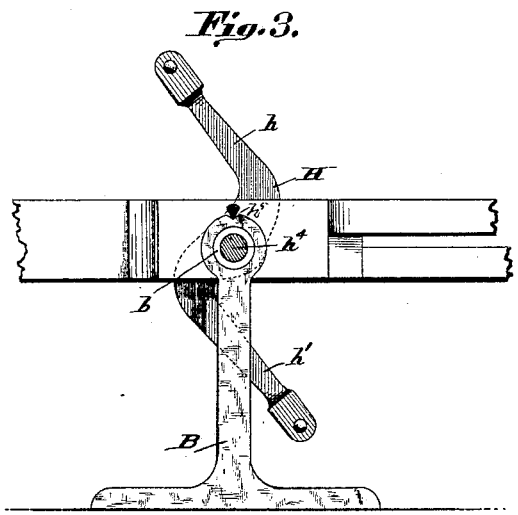
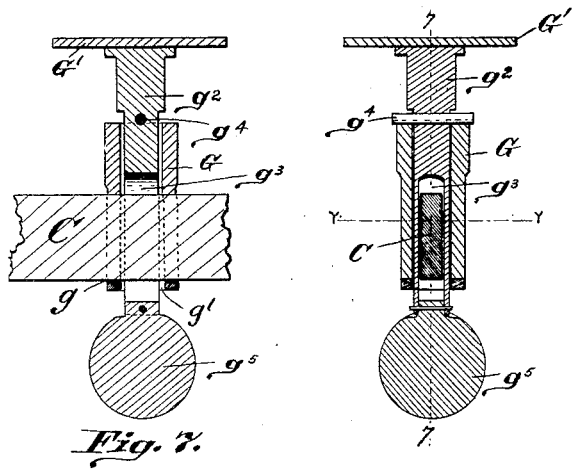
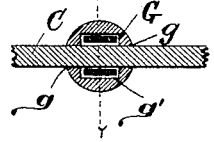
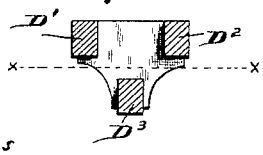
WITNESSES:
O. M. Hill
Jno. W. Frehli
INVENTOR
Newton W. Austin
her Wm. Hubbell Fisher
ATTORNEY

UNITED STATES PATENT OFFICE.

NEWTON W. AUSTIN, OF NEWPORT, KENTUCKY.

WEIGHING AND PRICE SCALE.

SPECIFICATION forming part of Letters Patent No. 346,017, dated July 20, 1886.

Application filed December 15, 1885. Serial No. 185,741. (No model.)

*To all whom it may concern:*

Be it known that I, NEWTON W. AUSTIN, a citizen of the United States, and a resident of the city of Newport, in the county of Campbell and State of Kentucky, have invented certain new and useful Improvements in Weighing and Price Scale, of which the following is a specification.

The object of my invention is to provide a scale which may be employed for ordinary weighing, and may also be employed to weigh out a given value of a substance, the price per pound or ounce being given.

Figure 1:
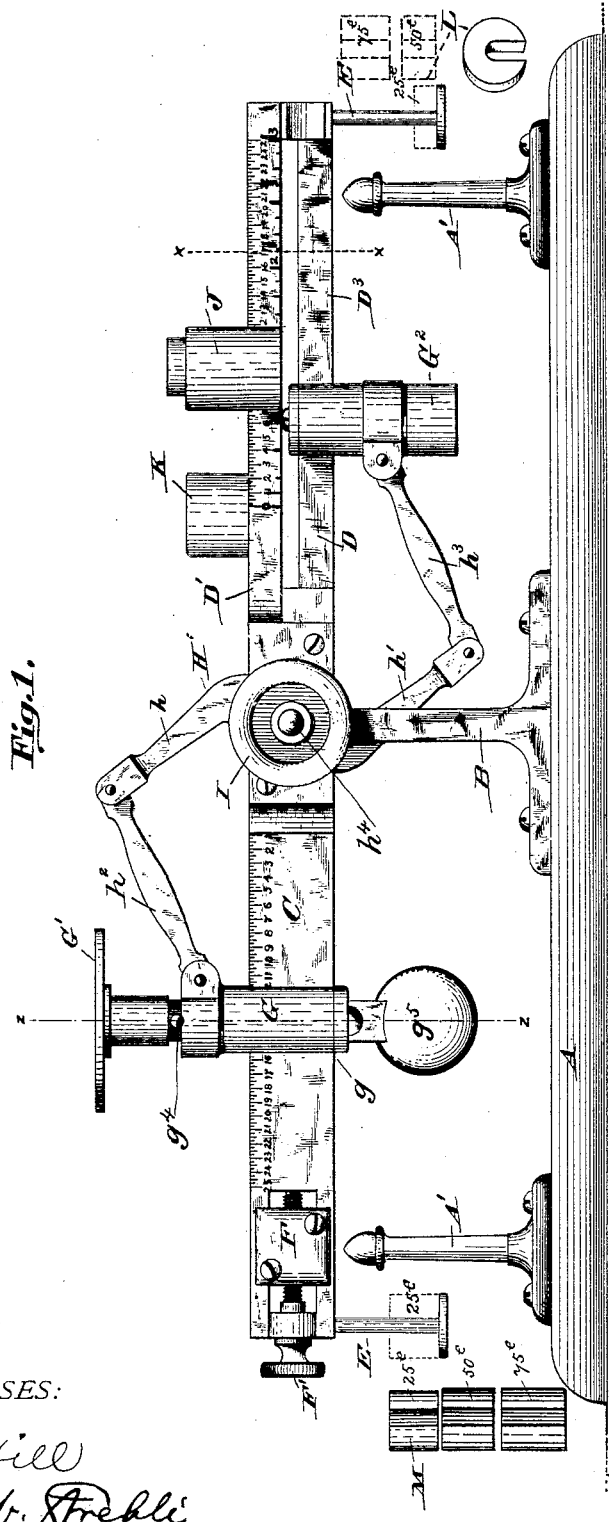
Figure 2:
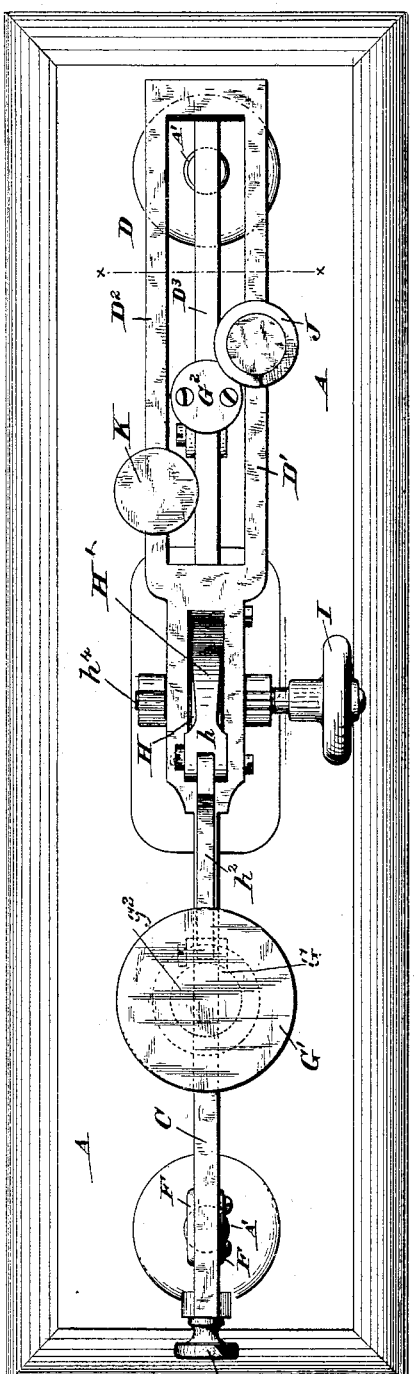

In the accompanying drawings, Figure 1 is a side elevation of my improved scale. Fig. 2 is a top view of the device shown in Fig. 1. Fig. 3 is a partial elevation of the parts shown in Fig. 1, the thumb-head being cut away. Fig. 4 is a section taken at the line $z\, z$, Fig. 1. Fig. 5 is a section taken at the line $x\, x$, Fig. 1. Fig. 6 is a section taken at the line $y\, y$, Fig. 4. Fig. 7 is a section taken at the line 7 7, Fig. 4.

The scale is preferably supported on a base-plate, A, by the aid of standards B, on which the beam rests, by knife-edges in grooves in the usual manner. Stops A' prevent excessive motion of the beam. The left-hand arm C of the beam, as shown in Fig. 1, consists of a single arm, while the right-hand half D consists of three secondary parallel arms, $D'\, D^2\, D^3$. Each of the main arms C and D is provided with a hanger, E, to support additional weights. An adjusting-weight, F, is preferably placed in a slot in the end of the arm C, and is adjusted in position by the set-screw F'. This adjusting-weight F' is used to bring the scale into true balance before weighing operations begin. A slide, G, is placed on the arm C and carries on its top the pan or scoop G'. The special preferred construction of this slide G will be described farther on. The arm $D^3$ is provided with a non-removable weight, $G^2$, whose weight exactly equals the combined weight of the slide G and its appendages.

By reference to Fig. 2 it will be seen that the central portion of the beam is provided with an opening, H, through which the bent lever H' passes. The bent lever H' consists of two equal arms, $h\, h'$, and is fulcrumed to the beam at its center—that is to say, immediately under the balancing knife-edges $h^5\, h^5$. This construction is well shown in Fig. 3. One of the arms of the lever H', preferably the one which projects above the beam, is connected to the slide G by the connecting-rod $h^2$. The other arm of the lever H' is similarly united to the slide $G^2$ by a connecting-rod, $h^3$. The connecting-rods $h^2$ and $h^3$ are equal in length. The fulcrum $h^4$ of the lever H' is prolonged and forms the axis of the thumb-head I, which is rigidly attached to it, as is also the lever H'. This fulcrum $h^4$ passes through the opening $b$ in the upper end of the standard B. The opening is somewhat larger than the diameter of the fulcrum $h^4$, to accommodate the movements of this latter.

The pan G' must at all times be kept level, and the special mechanism to secure this is illustrated in Figs. 4, 5, 6, and 7. The slide G is provided with a transverse vertical slot, $g$, to accommodate the arm C. As will be seen in Fig. 7, the slide G rests on the arm C, inasmuch as the slot $g$ does not extend entirely to the top of the slide G. The slide G is also provided with a central vertical slot, $g'$, preferably square in section and considerably exceeding the slot $g$ in width. The pan G' is rigidly secured to the top of the bar $g^2$. The bar $g^2$, after being somewhat contracted, extends down through the slot $g'$. The slot $g'$ is somewhat larger in cross-section than the bar $g^2$. The lower part of the bar $g^2$ is provided with the slot $g^3$, enabling the bar to straddle the arm C. A pin, $g^4$, passes through the upper part of the rod $g^2$, and its ends rest in grooves in the top of the slide G, thus balancing the pan G' on the top of the slide G. When necessary, a heavy bob, $g^5$, is attached to the lower end of the rod $g^2$, and serves to hold the pan G' more firmly in place, and to secure its leveling. The arms D' and $D^2$ of the scale are provided with sliding weights J and K, the latter being the ordinary tare-weight. Additional weights, L and M, are provided for the holders E. It is only necessary to graduate two of the arms of the scale—viz., C and D', as shown in the drawings. The arm C is conveniently graduated from 1 to 25, each subdivision being in turn divided into fourths. The arm D' is graduated from 0 to 25, each division being similarly divided into fourths. The arm D' is also provided with a coarser scale extending from 0 to 3, and having each division subdivided into eighths. This coarser division is the weight-scale, and the whole divisions correspond to pounds. The finer division is known as the "total-price scale," and the whole divisions correspond to cents.

The method of using the scale is as follows: When the slide G, whose inner edge serves as an index or pointer on the scale-beam C, is placed at the division 1, the scale becomes an ordinary weighing-scale, and the weight of an article placed on the pan G' is determined by lower scale on the arm D'. The particular use of the scale, however, is to find the price of an article, the price per pound being given. Let us suppose, by way of example, that it is desired to find the value of a piece of meat which is selling at twelve cents per pound. By turning the thumb-head I the slide G is moved along the arm C until it makes 12, as shown in the drawings. At the same time the slide G is moved, the counterbalancing-slide $G^2$ also is moved, and to the same extent, so that at whatever point of the arm C the slide G may be set the scale will be in balance. The meat is now placed on the pan G' and the scale balanced by the weight J. The division at which the weight J balances the scale gives the whole value of the meat in cents. If the meat amount to more than twenty-five cents in value, the weight J will not balance it, and the weight L, corresponding to twenty-five cents, must be placed on the holder E of the arm D. It is convenient to provide a series of weights, L, corresponding to twenty-five, fifty, and seventy-five cents. When the price per pound of the article to be weighed is greater than twenty-five cents, an additional weight, M, must be put upon the holder E of the arm C. It is desirable to have a series of weights, M, corresponding to twenty-five, fifty, seventy-five, and one hundred cents. When the article to be weighed requires the use of a receptacle other than the proper pan or scoop of the scale, this receptacle must be tared before the article is weighed. To tare the receptacle, first set the slide G at the price per pound, then put the receptacle on the pan G' and balance the scale with the tare-weight K. The article to be weighed is now placed in the receptacle and balanced by the weights J and L, in the manner and for the purpose already described.

The scale may also be used to weigh out a given value of an article, the price per pound being given. Thus, to weigh out seventy-five cents' worth of butter at twenty-two cents per pound, the slide G is placed at 22, the seventy-five-cent weight L is placed on the holder E, and sufficient butter is put on the scale-pan G' to balance the scale.

When desired, the receiving pan or scoop G', or an equivalent vessel, may be placed below the beam C, and be suspended from or depended from the lower end of the bar $g^2$. In such event the bob $g^5$ may be dispensed with.

My invention is applicable to platform-scales and the like.

While the various features of my invention are preferably employed together, one or more of said features may be employed without the remainder, and, in so far as applicable, one or more of said features may be applied in connection with scales or weighing devices other than those herein specifically set forth.

What I claim as new and of my invention, and desire to secure by Letters Patent, is—

1. In a computing-scale, as a means for adjusting the scale-pan and its counter-balance, the combination of the connecting-rods $h^2\ h^3$, lever H', fulcrum $h^4$, and thumb-head I, substantially as and for the purposes specified.

2. In a computing-scale, the combination of the scale-pan slide and its counter-balance, the connecting-rods $h^2\ h^3$, lever H', fulcrumed in the beam, fulcrum $h^4$, and thumb-head I, substantially as and for the purposes specified.

3. In a computing-scale, the combination of the standards B, one of which is provided with opening $b$, beam C, balanced on knife-edges on the tops of standards B, and having an opening, H, lever H', fulcrum $h^4$, thumb-head I, arms $h^2$ and $h^3$, and a scale-pan slide and its counter-balance, substantially as and for the purposes specified.

4. The combination of beam C, slide G, provided with transverse slot $g$ and longitudinal slot $g'$, bar $g^2$, provided with pin $g^4$, and slot $g^3$ and bob $g^5$, and having on its top the scale-pan G', substantially as and for the purposes specified.

NEWTON W. AUSTIN.

Attest:
FRANCIS THOMAS,
M. M. SMITH.